US005755374A

United States Patent [19]
Prigmore

[11] Patent Number: 5,755,374
[45] Date of Patent: May 26, 1998

[54] METHOD OF BRAZING

[75] Inventor: Robert M. Prigmore, Ammanford, United Kingdom

[73] Assignee: Lexor Technologies Limited, Ammanford, United Kingdom

[21] Appl. No.: 557,089

[22] PCT Filed: Jun. 10, 1994

[86] PCT No.: PCT/GB94/01261

§ 371 Date: Dec. 6, 1995

§ 102(e) Date: Dec. 6, 1995

[87] PCT Pub. No.: WO94/29072

PCT Pub. Date: Dec. 22, 1994

[30] Foreign Application Priority Data

Jun. 15, 1993 [GB] United Kingdom ............... 9312328.9

[51] Int. Cl.[6] .................. B23K 1/00; B23K 35/365
[52] U.S. Cl. ............... 228/183; 228/223; 228/262.43; 228/254; 148/24; 427/310; 165/133
[58] Field of Search ................ 228/183, 207, 228/223, 262.43; 148/24; 427/310, 180; 165/133, 905

[56] References Cited

U.S. PATENT DOCUMENTS

| 1,817,888 | 8/1931 | Lowe . | |
|---|---|---|---|
| 3,175,286 | 3/1965 | Cape . | |
| 3,389,116 | 6/1968 | Saba | 106/404 |
| 3,703,254 | 11/1972 | Maierson et al. | 148/24 |
| 3,971,501 | 7/1976 | Cooke | 228/248.1 |
| 4,019,875 | 4/1977 | Dittrich et al. | 427/451 |
| 4,097,266 | 6/1978 | Takahashi et al. | 148/24 |
| 5,328,522 | 7/1994 | Sowa et al. | 148/24 |
| 5,573,602 | 11/1996 | Banerji et al. | 148/24 |

FOREIGN PATENT DOCUMENTS

| 0036594 | 9/1981 | European Pat. Off. . |
| 0049489 | 4/1982 | European Pat. Off. . |
| 0140267 | 5/1985 | European Pat. Off. . |
| 2184474 | 12/1973 | France . |
| 2198003 | 3/1974 | France . |
| 4111993 | 4/1992 | Japan . |
| 1427286 | 3/1976 | United Kingdom . |
| 9417941 | 8/1994 | WIPO . |

*Primary Examiner*—Samuel M. Heinrich
*Attorney, Agent, or Firm*—Synnestvedt & Lechner

[57] ABSTRACT

A method of brazing is described, the method comprising the steps of applying a layer of particles of an aluminum alloy filler material said particles having a coating of a flux-type material selected from the group comprising a compound of potassium fluoride and aluminum fluoride together, or other inorganic flux-type material, to at least one of said articles such that said particles are retained at or adjacent at least a part of the joint between said articles; heating to cause the flux-type material and said aluminum alloy filler material to melt and form a brazed joint.

22 Claims, 4 Drawing Sheets

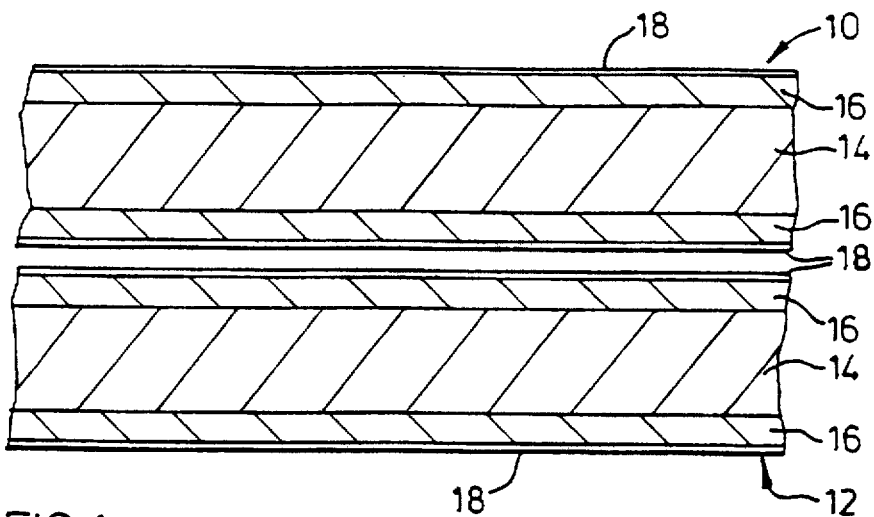
FIG. 1  PRIOR ART
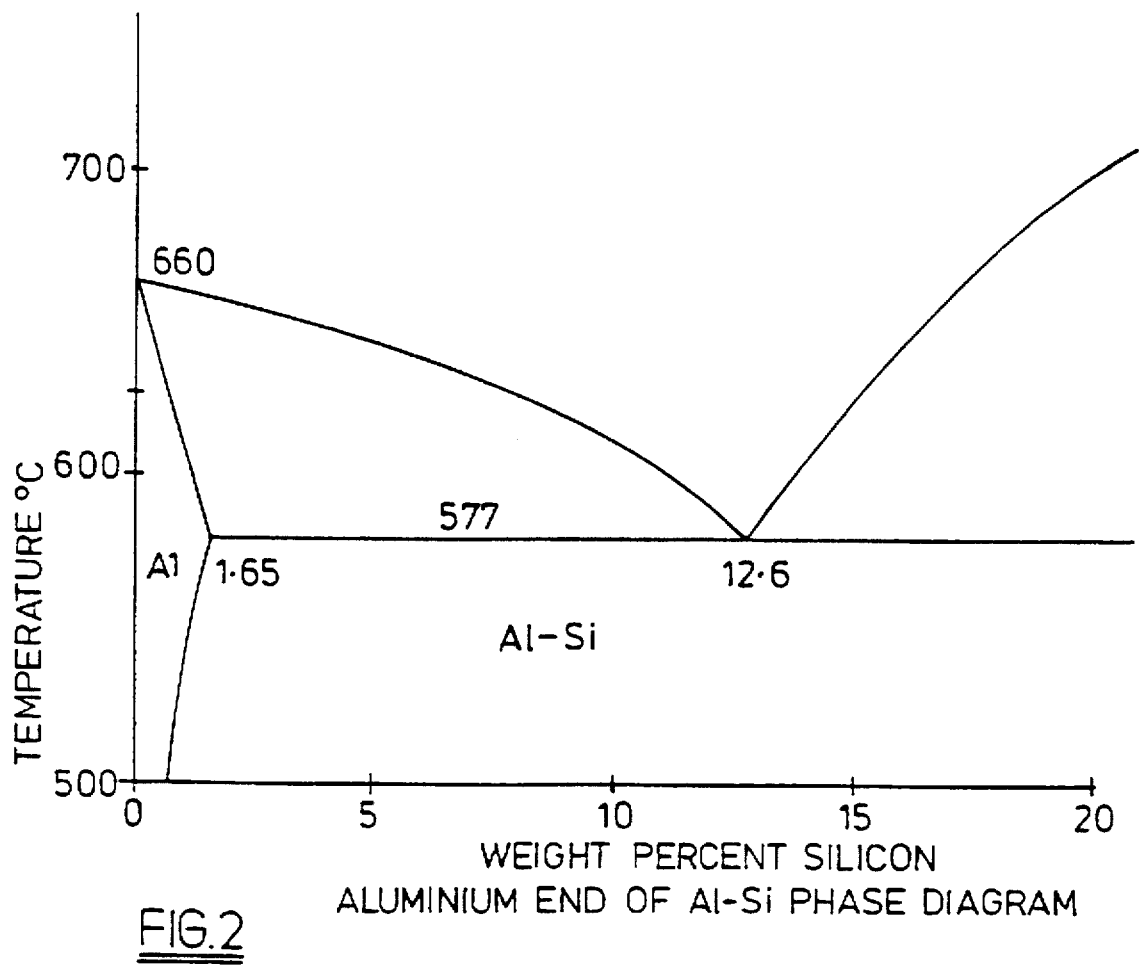
FIG. 2  ALUMINIUM END OF Al-Si PHASE DIAGRAM

METHOD OF BRAZING

The present invention relates to a method for the joining together by brazing of two or more metal articles.

Brazing processes for the joining together of two or more articles made of metal such as aluminum-based material are well known. However, in the case of aluminum materials, all the known methods have disadvantages relating to difficulty of process control, and hence reliability of the brazed joint, limitations on materials which may be employed, disadvantages of cost or any combination of these.

One known process, widely employed for the production of aluminum heat exchangers, such as radiators for vehicles for example, requires that the aluminum material of which the radiator is composed is first clad with a brazing alloy of a second aluminum alloy having a lower melting point than the substrate aluminum material. The requirement for cladding, usually carried out by a cold-pressure welding technique such as roll-bonding, is very expensive, and brings with it further disadvantages.

Because of the number of different sized tubes and components used in a radiator assembly, it is only economically feasible to carry out the cladding process on sheet or flat strip material from which the various radiator components are then fabricated.

In the case of tubular components, this necessitates a seam-weld which causes the substrate aluminum material and the cladding alloy to fuse together thus lowering the melting point of the resulting alloy in the welded region, relative to the substrate material, through the complete wall thickness of the tube component in the heat affected zone (HAZ). This results in the generation of high levels of scrap due to the penetration of the braze into the welded tube in the HAZ causing cracks and/or pinhole porosity.

The clad brazing alloy is usually an aluminum-silicon alloy of around eutectic composition. Silicon from the cladding alloy tends to diffuse into the substrate material over the entire clad area lowering the melting temperature even before the clad brazing alloy has melted. This exacerbates the problem of penetration and porosity.

Because of the method of forming the radiator tube sections, they are relatively weak, and even those tubes which do not have readily apparent leaks may be relatively weak and fail prematurely in service due to fatigue from flexing due to the fluctuating water pressure in the radiator. In practice, the use of higher strength aluminum alloy having better fatigue resistance is precluded in the known brazing processes because the fluxes which are employed are known to react with the alloying constituents negating the fluxing effect and also adversely affecting the melting behaviour of the aluminum alloy.

U.S. Pat. No. 3,951,328 describes a process for brazing aluminum heat exchangers as described above. This document describes the use of a flux of potassium fluoaluminate formed by fusing together potassium fluoride and aluminum fluoride such that no free potassium fluoride remains. The fused mixture is then ground into a powder and used as a flux. The document also mentions that the flux powder may be combined with aluminum alloy braze powder to form a physical mixture of the different types of powder particle and used to braze unclad aluminum material components. However, the quality of joint produced by this latter method is relatively poor and has a high reject rate. Thus, industrial processes currently in use employ the clad brazing alloy route.

EP-A-0140267 describes a method of brazing an aluminum material by forming thereon a flux layer of potassium pentafluoaluminate by electrochemical deposition from an aqueous solution to produce a chemical conversion coating either on the material to be joined together or on braze particles.

It is an object of the present invention to provide a reliable brazing process which does not require the aluminum substrate material to be clad.

It is a further object of the present invention to provide a brazing process which allows the use of extruded tube sections having higher strength and/or made from aluminum alloy having a higher strength, thus being inherently more fatigue resistant.

It is a yet further object of the present invention to provide a brazing process whereby the brazing filler material and any flux-type material may be accurately located on the components to be joined to reduce the amount of these materials which are used to effect the brazed joint and thus reduce wastage.

It is yet another object of the present invention to provide a process for rendering a substrate susceptible to wetting by a molten aluminum filler material and thus forming an adherent aluminum material coating on the substrate. The aluminum material may be substantially pure aluminum or may be an aluminum alloy.

According to a first aspect of the present invention there is provided a method of forming an adherent aluminum material coating on a substrate having a higher melting point than said aluminum coating material; the method comprising the steps of applying a layer of particles of said aluminum material which are themselves coated with an inorganic flux-type material selected from the group comprising a compound of potassium fluoride and aluminum fluoride together or other inorganic material, raising the temperature to cause said flux-type material and said aluminum coating material to melt and adhere to said substrate; and cooling the substrate to solidify said aluminum coating material.

In the present invention, some of the aluminum materials comprising particles having a coating of a flux-type material and their method of manufacture are described in International patent application number PCT/GB94/00219 and claiming priority from British patent application number 9302387.7 of Osprey Metals Limited and the content of which is incorporated herein by reference.

The method according to the first aspect may be used to produce an aluminited coating on a ferrous, e.g. steel, substrate for example. The coating may be used purely as a protective, corrosion resistant coating or may be used as an intermediate interface layer between the ferrous substrate and an article of an aluminum material simultaneously or subsequently bonded thereto by the brazing method.

In one embodiment of the method of the present invention, a layer of a liquid resin or plastics material (hereinafter referred to as 'resin') is first applied to the substrate to be coated. The liquid resin material may comprise any suitable resin which may be dissolved in a solvent, for example, and subsequently solidified by driving off the solvent by, for example, heating. The use of a liquid resin allows the filler material and flux-type material to be accurately placed on the substrate in the specific areas where it is required, thus reducing waste. The liquid resin may be applied by printing, spraying, brushing or painting on the substrate or by any other suitable method of application known in the art.

Desirably, the resin material should leave no residue after heating for its removal. On heating the resin should be entirely removed before the aluminum material and flux-type material have started to melt.

Acrylic resins such as, for example, polymethylmethacrylate and its variants have been found to be suitable. Suitable solvents may include chlorinated hydrocarbons such as trichloroethylene, hydrocarbons such as toluene and ketones such as methyl ethyl ketone for example.

The aluminum filler material and flux-type material may be mixed with liquid resin and applied to the substrate simultaneously, or may be "dusted" onto the liquid resin after the resin layer has been applied. The result of either technique is to cause the aluminum material and flux-type material to adhere to the surface of the substrate only in those areas where it is desired. However, it is preferred to 'dust' the coated powder particles onto the resin as the particles are not then entirely coated by the resin and the possibility of the flux-type material being subsequently harmed by the resin during heating is greatly reduced.

Alternatively, the coated aluminum-based filler material particles may be applied by any suitable carrier medium including, for example, an aqueous slurry.

According to a second aspect of the present invention there is provided a method of joining together two or more articles of aluminum-based material; the method comprising the steps of applying a layer of particles of an aluminum alloy filler material said particles having a coating of a flux-type material selected from the group comprising a compound of potassium fluoride and aluminum fluoride together, or other inorganic flux-type material, to at least one of said articles such that said particles are retained at or adjacent at least a part of the joint between said articles; heating to cause the flux-type material and said aluminum alloy filler material to melt and form a brazed joint between said two or more articles.

The articles of aluminum-based material may be unclad.

The aluminum alloy filler material may contain silicon in the range from 5 to 50 wt %. Preferably, where the alloy contains silicon, this may be in the range from 7 to 15 wt %.

Where the filler material is an aluminum-silicon alloy, it may also contain other alloying additions such as copper and/or magnesium, for example.

In one embodiment of the method of the present invention the composition of the aluminum alloy filler material includes silicon in the range from about 9 to about 12 wt %.

Other aluminum alloys such as aluminum-copper, aluminum copper-magnesium, aluminum-zinc and aluminum plus rare-earth metals, for example, may be used.

Preferably, the compound of potassium fluoride and aluminum fluoride flux-type material comprises from 40 to 50 wt % of potassium fluoride and from 60 to 50 wt % of aluminum fluoride.

The proportion of flux-type material to metal in the braze particles may lie in the range from about 5 to 30 wt %. A preferred range may be from about 10 to 20 wt % of flux-type material to metal.

The layer of coated particles may be applied as a monolayer of particles.

As with the method of the first aspect, the coated particles may be adhered to the surface with a resin medium or with any other suitable carrier medium, the same considerations again applying. The solidified resin allows more robust handling of any assemblies prior to brazing without the danger that the aluminum alloy filler material and the flux-type material will be shaken off.

The thickness and consistency of the applied resin layer may be controlled to govern the quantity of the coated metal powder particles which may be made to adhere to the substrate.

All the parameters of the resin discussed with reference to the first aspect of the invention are applicable to the second aspect.

Prior to coating the substrate of the articles to be joined, with the liquid resin, at least the surfaces to be joined may first be cleaned by degreasing followed by a step such as acid etching, for example, to remove the oxide film present on aluminum materials.

It must be stressed, however, that any method of retaining the braze particles in the required ed position may be employed, including trapping the particles between the surfaces to be joined.

It is a particular advantage of the present invention that the method has been found to be significantly more tolerant of surface contaminants, both inorganic and organic, than known brazing processes. In known processes, degreasing and acid etching to remove surface contaminants and the oxide film has been necessary. Alternatively, ultrasonic degreasing which also disrupts the oxide film has been used. In the method of the present invention, it has been found that removal or disruption of the oxide film is not necessary.

It has been found that on melting, the fused potassium fluoride/aluminum fluoride flux-type coating on the aluminum-silicon alloy particles reacts with the surface of the aluminum substrate to disrupt the oxide film and allows the molten particle contained within the coating to alloy with the metallic surface of the substrate. Tests conducted on articles brazed together by the method of the second aspect have shown substantial quantities of silicon present in the surface regions of the substrate. Furthermore, the quantity of filler material, as witnessed by the braze fillets present within the body of the joint and at the periphery of brazed joints, significantly exceeds the quantity of metal initially applied in the form of aluminum alloy braze particles.

It has been found, surprisingly, that the flux-type coating on the metal particles has a lower melting point than would be expected from the phase diagram shown in FIG. 3. From FIG. 3 it may be seen that the melting temperature of the eutectic formed by the constituents, potassium fluoride and aluminum fluoride, of the flux-type coating is about 575° C. However, it has been found that the flux-type coating on the particles displays a liquidus temperature of about 540° C., significantly lower than would be expected, indicating that the metal braze material and flux-type material react with each other during manufacture to give a lowering of the liquidus temperature, perhaps by inclusion of silicon into the coating structure to form one or more compounds within the flux-type coating. The metal braze particles are produced by atomization of the molten metal and react during manufacture with the molten fused salt mixture of potassium fluoride and aluminum fluoride.

It has been found that the flux-type coating does melt first and reacts with the surface of the substrate aluminum material to disrupt the oxide film at and adjacent the point of contact of the particle with the surface. The flux-type material protects both the localised region of the substrate and the encapsulated particle from further oxidation on melting of the particle and allows the surface oxide films to be disrupted and absorbed by the flux-type material. The molten metal is drawn into the joint by capillary action to form a bond. The surface of the substrate is increased in silicon content while the quantity of molten metal produced in the joint region significantly exceeds the amount of metal supplied in the form of metal braze particles.

In the prior art as exemplified by U.S. Pat. No. 3,951,328, it is stated that it does not affect the resulting joint if the braze particles melt before the flux. However, it is believed by the Applicant that it is important for the flux-type coating on the metal particle to melt first in order to protect both the substrate and the encapsulated particle during heating and melting of the latter. It is believed that the lowering of the melting point of the coating is directly attributable to the manufacturing process of the coated particles whereby a molten coating is applied during manufacture of the aluminum-silicon alloy particles. It is believed that at least silicon and perhaps further aluminum diffuses into the coating to give the lowering of the eutectic temperature displayed in FIG. 3. It is also believed that some flux-type material may be contained within the metal braze particles themselves.

It is believed that the fused flux-type material formed from potassium fluoride and aluminum fluoride in proportions about the eutectic composition is substantially potassium aluminum fluoride, $KAlF_4$, with constituents derived from the metal particle.

The potassium fluoride and aluminum fluoride mixture may comprise the naturally occurring mineral, cryolite.

An advantage of the method of the present invention is that aluminum braze filler materials having lower melting points than used heretofore may now be used due to the lower melting point of the flux-type material.

A further advantage of the method of the present invention is that there is no possibility of the metal braze particles and flux-type material segregating since the two constituents are combined together unlike the physical mixtures of flux and braze particles of the prior art.

The aluminum alloy braze material and the flux-type coating material both melt at a substantially lower temperature than that of the substrate aluminum-based material. Therefore, there is no need for the substrate articles to be clad with a lower melting point material prior to brazing. Tubes for radiators may now be formed by extrusion, thus there is now no need to form weld seams which have different melting characteristics from the rest of the tube. Since the tubes may now be formed by extrusion, they may also have increased wall thickness and may also be formed with internal strengthening ribs to lessen the possibility of fatigue failure of the tubes.

In addition to the tubes being made by an extrusion technique, aluminum alloys of higher strength may also be used since the flux-type material used in the present invention is not adversely affected by alloying elements such as magnesium for example, and neither is the substrate material adversely affected by the flux-type material.

In order that the present invention may be more fully understood, an example will now be described by way of illustration only with reference to the accompanying drawings, of which:

FIG. 1 shows a schematic cross-section through part of two articles to be joined by a prior art brazing process;

FIG. 2 shows part of the aluminum-silicon binary phase equilibrium diagram;

Figure 3:
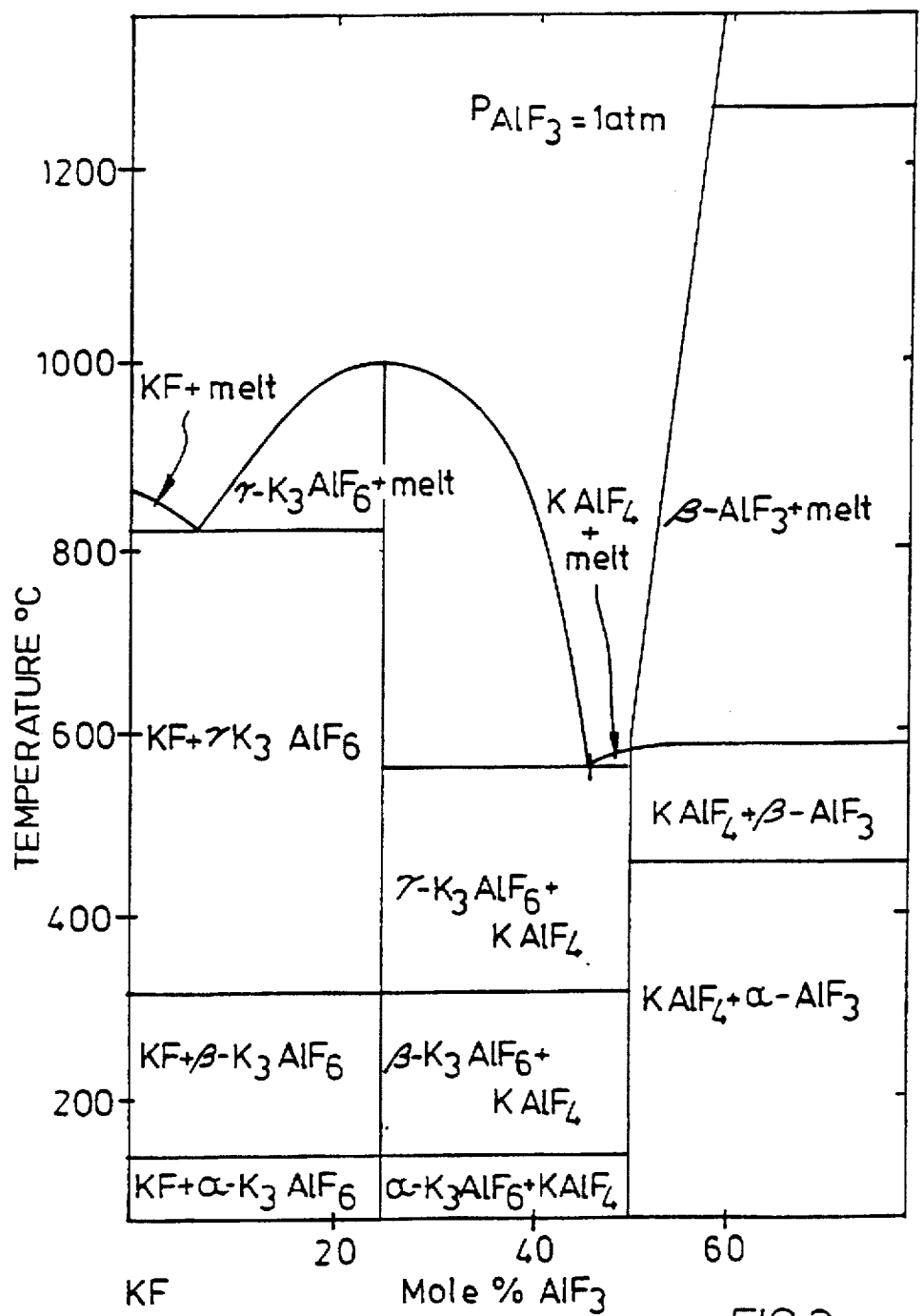
FIG. 3 shows a part of the potassium fluoride-aluminum fluoride phase equilibrium diagram.

Referring now to FIG. 1 and where two articles 10 and 12 are to be joined by brazing. Each article comprises a core 14 of the substrate structural aluminum material, and which is clad on both sides with a layer 16 of a second aluminum alloy material having a substantially lower melting point than that of the core 14. The surfaces of the two articles are degreased and cleaned by, for example, etching to promote the adherence of a flux material. In the case of a vehicle radiator, the degreased and cleaned component parts, typically comprising airway fins, water tubes, tube plates and side water casings, are assembled together and dipped into a suspension of a flux in deionised water. The dipped assembly is removed from the flux bath and dried to form a coating 18 of the flux on the clad surfaces. The assembly is then passed into a brazing oven where the temperature is raised to cause first the flux and then the clad surfaces to melt and fuse together to form the brazed joint. One problem which arises with this prior art method is that the flux is highly reactive and will react with contaminants such as water vapour in the brazing furnace atmosphere thus negating the desired effect of the flux. Furthermore, the clad alloy 16 must be metallurgically bonded to the substrate 14 to obviate the formation of an oxide film at the interface between the layers 14 and 16 which would prevent a sound joint being formed between the cladding 16 and the core 14 on melting of the cladding. Because of the need for a metallurgical bond between the core and the cladding, the use of roll-bonding in sheet form is virtually mandatory in order for high enough reductions to be achieved in the working process to secure a metallurgical bond. Thus, tubular items must be fabricated from sheet material by seam-welding causing the problems specified above relating to lowering of the melting point through the wall thickness of the tube due to the cladding material alloying with the core material.

Brazing trials were carried out with radiator components made of unclad aluminum alloy having a nominal composition of 0.6 Si/0.7 Fe/0.05–0.2 Cu/1–1.5 Mn/Balance Al. The components were degreased. After drying, the components were coated with a layer of acrylic resin, in this case polymethyl methacrylate dissolved in toluene/trichloroethylene mixture, in those areas where a brazed joint was required. While the resin was still in the tacky state particles of metal powder of composition 10 wt % Si/Balance Al and having a coating of a flux-type material of composition 40 to 50 wt % potassium fluoride and 60 to 50 wt % of aluminum fluoride and near to the eutectic composition were dusted onto the surface with a powder spray gun. The coated powder particles had a size lying in the range from 60 to 250 μm. The coating thus formed was then dried with a warm air stream to dry the resin and cause the particles to adhere to the resin. The radiator components were then assembled together and passed through a brazing furnace having a nitrogen protective atmosphere. In a preheating zone of the furnace, the resin is driven off by the increasing temperature so that at the onset of melting of the coated particles, no resin remains. In driving off the resin coating, the heating rate should be sufficiently slow so as not cause spalling of the resin coating. The furnace temperature was set at a nominal temperature which was sufficient to cause melting of the flux-type material and the metal powder particles but not of the substrate aluminum alloy.

Figure 4A:
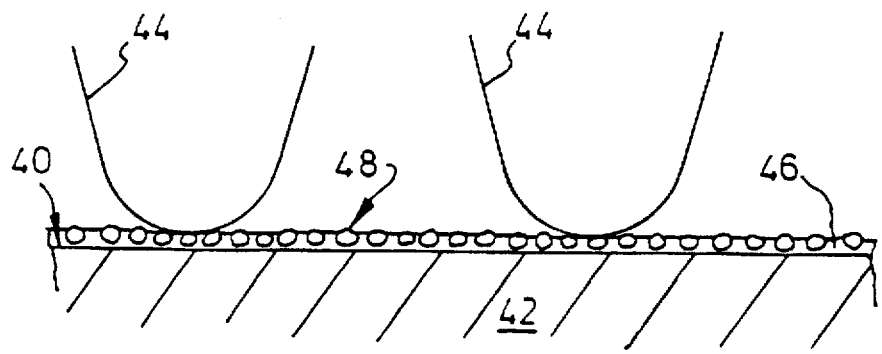
FIGS. 4A to 4F show a schematic step-by-step representation of the believed reaction of coated particles with a substrate during a brazing process.
Figure 4B:
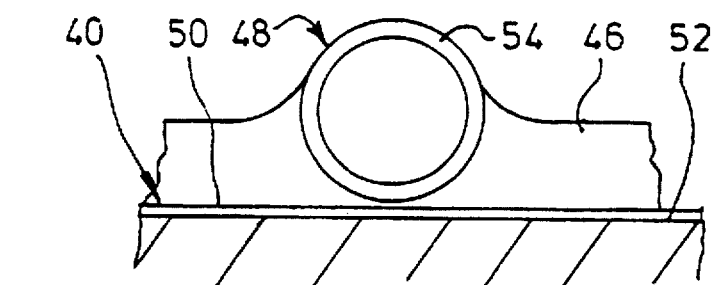
Figure 4C:
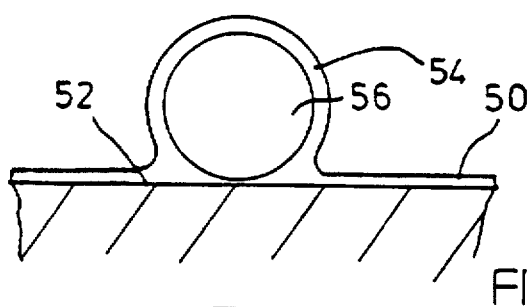
Figure 4D:
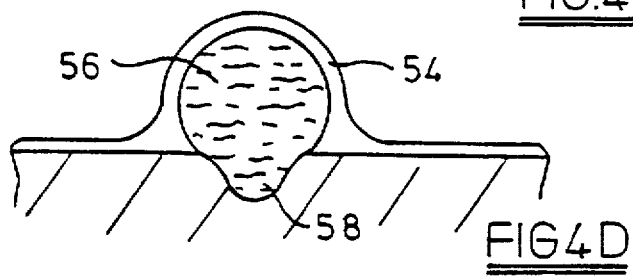
Figure 4E:
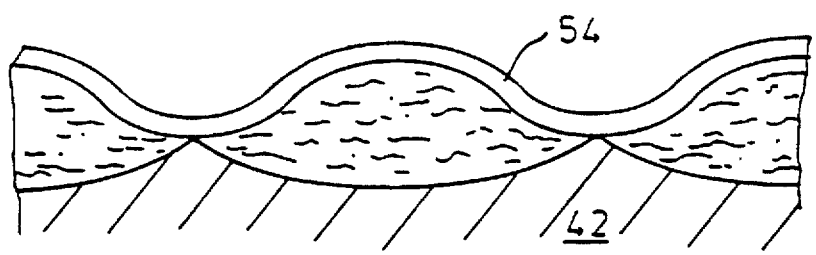
Figure 4F:
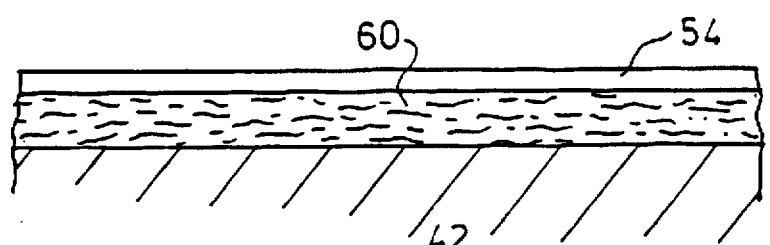

FIGS. 4A to 4F show a schematic representation of what is believed to be the course of forming a brazed joint by the method of the present invention. FIG. 4A shows the surface 40 of a tube 42 and portions of aluminum finning 44 to be brazed thereto for cooling purposes. A layer of resin 46 is applied to the surface 40 and coated particles 48 of aluminum-silicon braze alloy are dusted onto the liquid resin which is then dried. FIGS. 4B to 4E show the stages of reaction and melting of a coated particle with the surface 40. The surface 40 has an oxide layer 50 thereon, underneath which is the clean aluminum surface 52. On heating, the resin layer 46 dissociates and the products are removed by the flow of a nitrogen gas atmosphere to leave the particles 48 sitting on the surface of the oxide layer 50. As the temperature rises, the flux-type coating 54 melts at about 540° C. (FIG. 4C) while the aluminum-silicon particle 56 therein remains solid. The coating 54 reacts with the oxide layer 50 to disrupt it and allow the metal particle 56 to come into contact with the clean aluminum surface 52. It is believed that at this point substantial diffusion of the silicon from the particle into the substrate occurs. As the temperature rises to about 575° C., the metal particle melts and begins to fuse with the surface 52 to alloy therewith and initially form a pit 58 of molten metal. The silicon from the molten particle continues to diffuse into the molten pit (FIG. 4D) and the area of molten surface 52 spreads laterally to join with molten areas formed at adjacent particles (FIG. 4E). A complete layer of molten metal 60 is then formed (FIG. 4F) which is drawn into the gap between the surface 40 and the finning 44 by capillary action. The cooling finning material 44 is similarly affected by the melting of the flux-type coating to allow metal to metal contact between the finning 44 and braze 56. The original flux-type material absorbs the oxide to form a residue with the solidified flux-type material on cooling.

Figure 5:
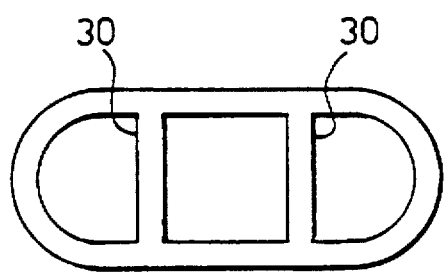
FIG. 5 which shows a cross section through an extruded radiator tube.

The method of the present invention allows the use of extruded tubes of various forms to replace the standard seam-welded clad alloy tubes used heretofore. FIG. 5 for example shows a cross section of the type of extruded tube which it is possible to employ with the brazing method of the present invention where no cladding is required. Tubes of flattened oval section having internal strengthening ribs 30 may be employed. Such tubes have greater surface area to volume ratio and are able to give greater cooling effect. The presence of the internal ribs 30 limits the amount of flexure which can occur due to fluctuating water pressure in the radiator and thus precludes failure by fatigue of the tube.

I claim:

1. A method of forming an adherent aluminum material coating on a surface of a substrate having a higher melting point than said aluminum coating material, wherein the method comprises the steps of:

applying to said substrate surface aluminum material braze particles coated with a flux material comprising potassium fluoride and aluminum fluoride, said aluminum material braze particles having been manufactured by atomization of the molten aluminum material and coated during said manufacture by atomization with the molten flux material comprising potassium fluoride and aluminum fluoride;

retaining said coated aluminum braze particles on said substrate surface by means of a resin which is applied to said surface; and raising the temperature of said substrate and said coated braze particles so as to cause said particles to melt and form an adherent coating on said substrate surface.

2. A method according to claim 1 wherein the coating is an aluminized coating on a ferrous substrate.

3. A method according to claim 1 wherein the coating is used as an intermediate brazing layer to join an article to said substrate.

4. A method of joining together articles of aluminum-based material, the method comprising the method of forming an adherent aluminum material coating according to claim 1, wherein a layer of said coated aluminum braze material particles is applied to and caused to be retained at or adjacent a desired joint area of at least one of said articles, and heating to cause said aluminum braze particles to melt and form a brazed joint between said articles.

5. A method according to claim 1 wherein the braze material includes silicon in the range from 5 to 50 wt %.

6. A method according to claim 5 wherein the braze material includes silicon in the range from 7 to 15 wt %.

7. A method according to claim 4 wherein the aluminum alloy braze material is selected from the group of alloys comprising aluminum-copper, aluminum-copper-magnesium, aluminum-zinc and aluminum plus rare earth metal.

8. A method according to claim 4 wherein the flux-type material comprises a fused mixture of aluminum fluoride and potassium fluoride.

9. A method according to claim 8 wherein the flux-type material coating comprises from 40 to 50 wt % of potassium fluoride and from 60 to 50 wt % of aluminum fluoride.

10. A method according to claim 9 wherein the flux-type coating is of substantially eutectic composition with respect to potassium fluoride and aluminum fluoride.

11. A method according to claim 9 wherein the flux-type coating also includes silicon.

12. A method according to claim 9 wherein the proportion of flux-type coating to metal is from about 5 wt % to about 30 wt %.

13. A method according to claim 12 wherein the proportion is from about 10 wt % to about 20 wt %.

14. A method according to claim 8 wherein said mixture of aluminum fluoride and potassium fluoride comprises cryolite.

15. A method according to claim 4 wherein said coated particles are mixed with said resin.

16. A method according to claim 4 wherein said coated particles are 'dusted' onto said resin.

17. A method according to of claim 4 wherein said resin is applied dissolved in a solvent to liquify it.

18. A method according to claim 4 wherein said resin is an acrylic resin.

19. A method according to claim 4 wherein said resin is polymethylmethacrylate.

20. A method according to claim 4 wherein said resin is removed by heating before said flux-type coating melts.

21. A method according to claim 4 wherein said flux-type coating melts before said aluminum coating or braze material.

22. A method according to claim 4 wherein said articles are unclad.

* * * * *

UNITED STATES PATENT AND TRADEMARK OFFICE
CERTIFICATE OF CORRECTION

PATENT NO. : 5,755,374
DATED : May 26, 1998
INVENTOR(S) : Prigmore

It is certified that error appears in the above-indentified patent and that said Letters Patent is hereby corrected as shown below:

Column 2, line 45, change "aluminited" to --aluminized--.

Column 3, line 59, start a new paragraph with "The solidified..."

Signed and Sealed this

Twenty-fifth Day of August, 1998

Attest:

BRUCE LEHMAN

Attesting Officer

Commissioner of Patents and Trademarks